Sept. 30, 1924.

A. H. STEBBINS 1,509,912

DUST COLLECTOR

Filed June 1, 1922

INVENTOR:
Albert H. Stebbins
BY Robt. P. Haine
ATTORNEY

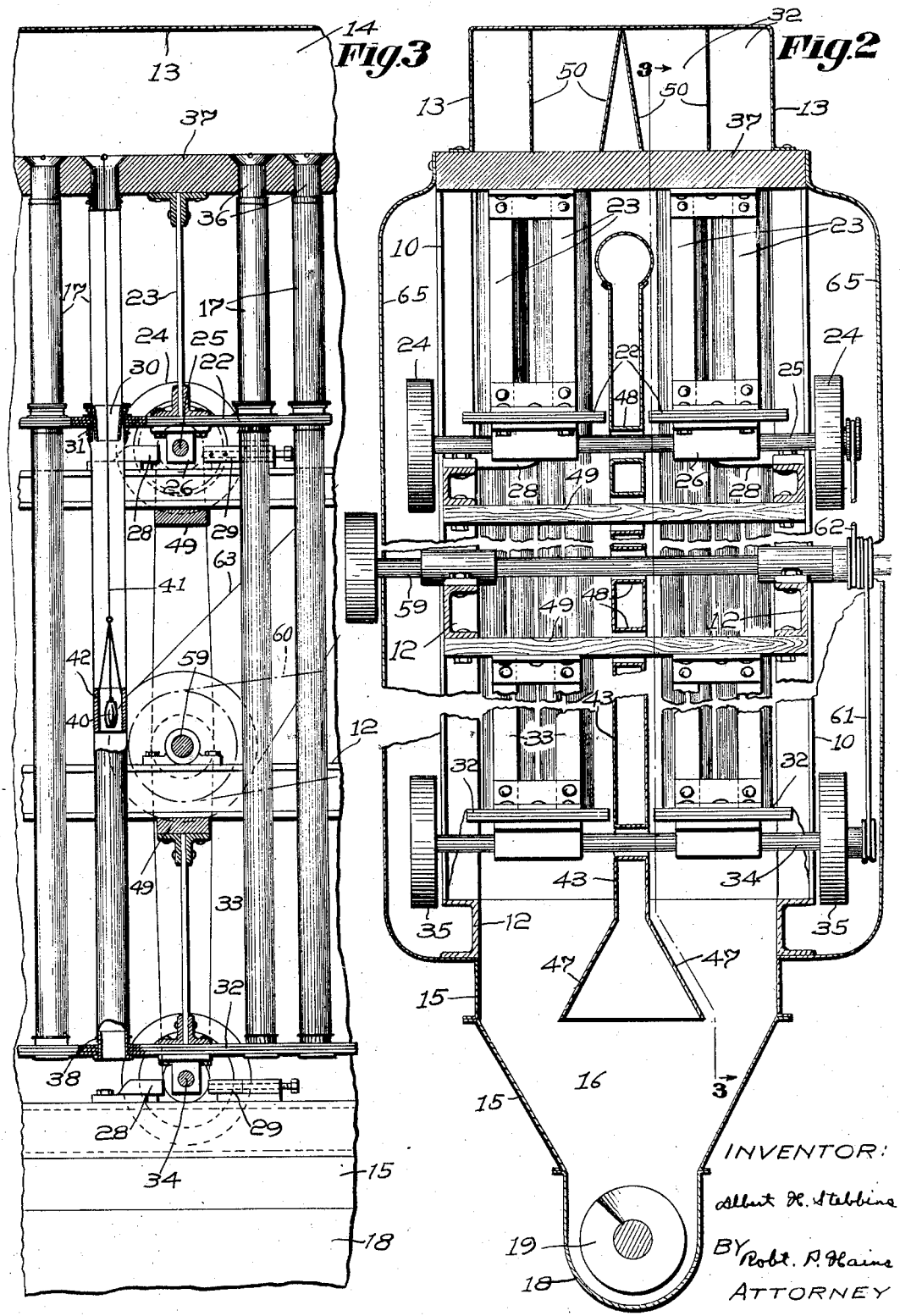

Sept. 30, 1924.
A. H. STEBBINS
1,509,912
DUST COLLECTOR
Filed June 1, 1922
3 Sheets-Sheet 3
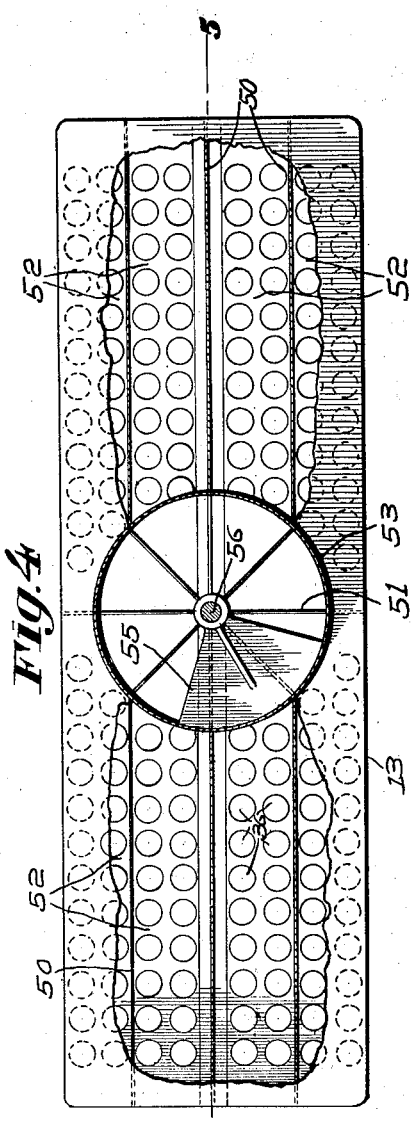
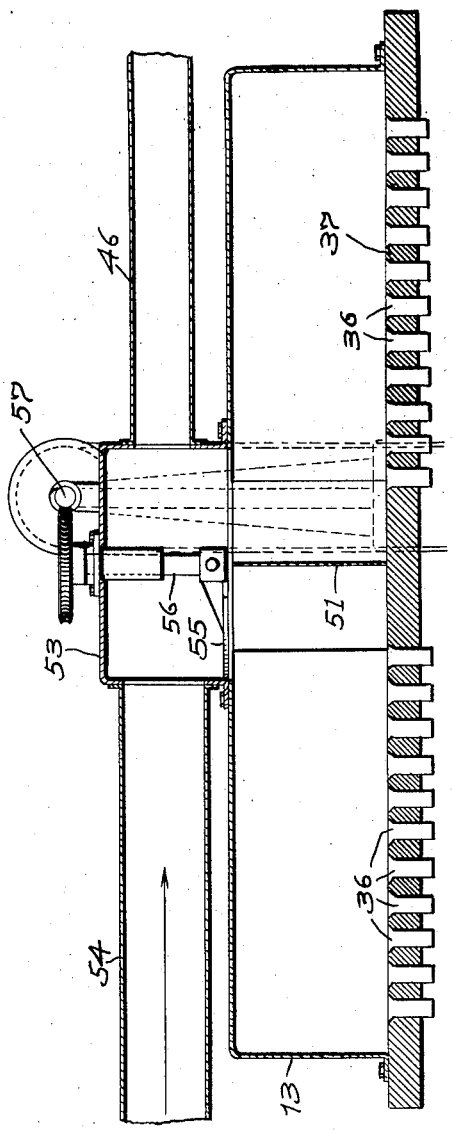
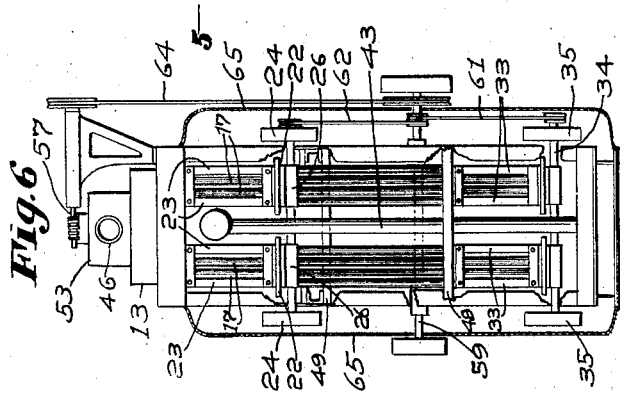
INVENTOR:
Albert H. Stebbins
BY Robt. P. Hains
ATTORNEY Patented Sept. 30, 1924.

1,509,912

UNITED STATES PATENT OFFICE.

ALBERT H. STEBBINS, OF LOS ANGELES, CALIFORNIA.

DUST COLLECTOR.

Application filed June 1, 1922. Serial No. 565,199.

*To all whom it may concern:*

Be it known that I, ALBERT H. STEBBINS, a citizen of the United States, residing at Los Angeles, county of Los Angeles, and State of California, have invented an Improvement in Dust Collectors, of which the following description, in connection with the accompanying drawings, is a specification, like characters on the drawings representing like parts.

This invention relates to dust collectors of the type in which dust laden air is introduced into fabric tubes so that the air may pass through the mesh of the fabric tubes while the dust is prevented by the mesh of the fabric from passing therethrough.

In dust collectors of this type, difficulty is experienced in preventing the dust from clogging the mesh of the tubes.

One important feature of the present invention, therefore, resides in a method of removing dust from the tubes, and in means of agitating the tubes to dislodge dust from the walls thereof.

The fabric tubes of the present type of dust collector are commonly supported in a vertical position so that the dust in the tubes will move downwardly therein due to gravity, but the dust in these tubes is often so fine that it will not settle downwardly therein as the air escapes through the walls of the tube.

Another important feature of the present invention resides in a method of drawing this very fine dust through the tubes, and in means for sucking the air from one end of the tubes and returning it to the other end of the tubes to maintain a flow of air throughout the length of the tubes.

Another feature of the invention resides in means for temporarily cutting off the supply of dust laden air to some of the tubes, and exhausting the air in these tubes to dislodge the dust from the walls thereof.

Another feature of the invention resides in a platform that supports the weight of the tubes intermediate of their ends and serves also to agitate the tubes.

Other features of the invention and novel combination of parts in addition to the above will be hereinafter described in connection with the accompanying drawings which illustrate one good practical form thereof.

In the drawings:

Fig. 2 is a transverse sectional view through the dust collector of Fig. 1 taken near the centre of the same;

Fig. 3 is a sectional view on line 3—3 of Fig. 2;

Fig. 4 is a sectional view on line 4—4 of Fig. 1 looking down and with part of the casing broken away;

Fig. 5 is a sectional view on line 5—5 of Fig. 4; and

Fig. 6 is an-end view of Fig. 1 with the end of the enclosing casing removed.

Figure 1:
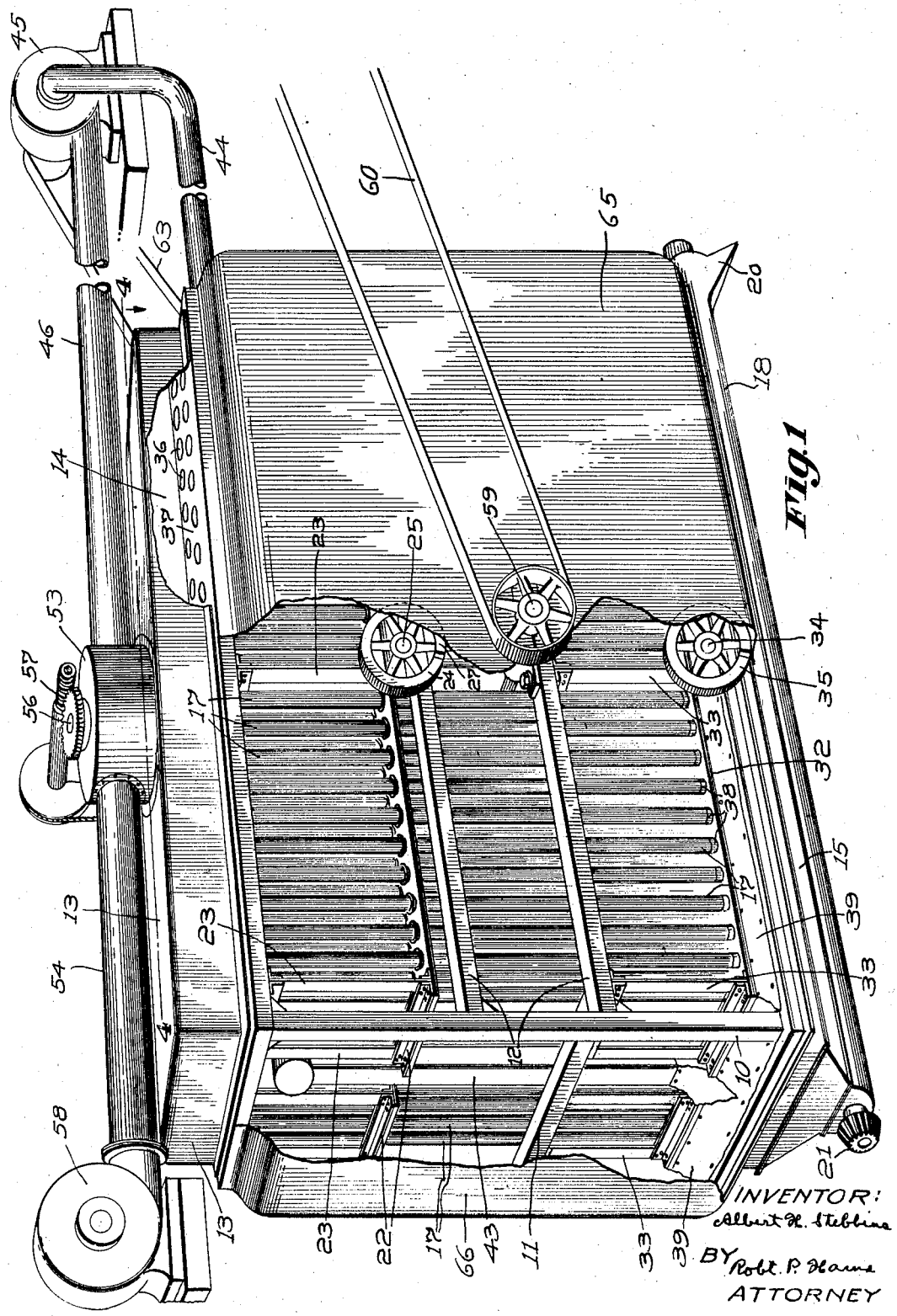
Fig. 1 is a perspective view of a dust collector constructed in accordance with the present invention and having part of the enclosing casing broken away.

The present invention may be given various embodiments and in the construction shown a frame is provided of rectangular shape and is formed of vertical beams 10 connected by transversely extending bar 11 and longitudinally extending bar 12. At the upper end of this frame is provided a casing 13 having a chamber 14 therein, and at the lower portion of the frame is provided a casing 15 having a chamber 16 therein. A number of tubes 17 are provided leading from the upper chamber 14 to the lower chamber 16 and the tubes are constructed of fabric or other material that is pervious to air but substantially impervious to dust.

Dust laden air is delivered to the upper chamber 14 so that it will enter the tubes 17 and squeeze outwardly through the mesh of the tubes leaving the dust behind. The tubes preferably are supported in a vertical position so that the dust will move downwardly therein by gravity to the lower chamber 16, and the lower casing 15 preferably has tapered walls, as shown in Fig. 2, which direct the dust that is removed from the air into a trough 18. A worm conveyor 19 may be provided in the trough 18 to advance the materials longitudinally of the trough toward the discharge chute 20, and the conveyor 19 may be rotated by a bevel gear 21 at one end thereof.

As stated, an important feature of the present invention resides in mechanism for agitating the tubes to dislodge the dust from the walls thereof. Various means to this end may be provided, and in the embodiment of the invention shown, a platform or table 22 is supported between the upper and lower chambers which engages the tubes 17, and a vibratory movement is imparted to the platform so that it will shake the tubes.

The platform 22 may conveniently be suspended from the upper part of the main frame by straps 23 for movement back and forth in a horizontal direction, and in the present case, a pair of platforms 22 is provided, one mounted on each side of the central longitudinal chamber, to be described. A vibratory movement is conveniently imparted to the platforms 22 by rotation of a pair of unbalanced wheels 24 secured to a shaft 25 extending through bearings 26 secured to the pair of platforms, as best shown in Fig. 2. A weight 27 formed upon one side of each wheel 24 causes the wheels and shaft to vibrate upon rotation, and this vibratory movement is imparted to the platforms 22 so that they will move back and forth. The back and forth movement imparted to the platforms may be limited by a fixed block 28 and an adjustable block 29 (see Fig. 3).

The fabric tubes 17 preferably do not pass through the apertures 30 within the platform, as relative movement between the walls of the apertures 30 and the tubes 17 might chafe the tubes, but the tubes 17 terminate at each side of the platform and are secured to nipples 31 extending outwardly from the opposite faces of the platform. The ends of the tubes may be slipped over the nipples 31 and secured thereto by any suitable gripping means. If the distance between the upper and lower chambers 14 and 16 is comparatively great the arrangement of the tubes just described has a second advantage in that it reduces the total length of the fabric tubes and thus reduces the weight and longitudinal stretching force upon the same.

It will be apparent that more than one platform may be provided to shake each tube, and in the present case, additional platforms 32 are provided near the lower casing 15 and are supported by straps 33. The platforms 32 may be vibrated by a shaft 34 and unbalanced wheels 35 similar to the platforms 22. In the present case each tube 17 consists of a short upper section and a long lower section. The upper sections are secured at their upper ends to nipples 36 fitted within apertures formed through a plate 37 upon which the casing 13 rests, and the lower ends of these sections are secured to the nipples 31 extending upwardly from the platforms 22. The long lower sections have their upper ends secured to downwardly extending nipples 31 and their lower ends are secured to nipples 38 extending upwardly from the platforms 32. The space between the lower platforms 32 and the lower casing 15 may be covered by strips of canvas or other flexible material 39 that will permit the platforms to move relative to the casing while air is prevented from escaping between the platforms and casing.

As a result of the construction described, vibratory movement will be imparted to the lower end of the upper tubes and to both ends of the lower tubes, and this will cause the tubes to shake throughout their length to dislodge the dust from the walls thereof. To further dislodge dust from the tubes, it may be desirable to suspend pendulums 40 within the tubes by cords or wires 41, and rings 42 may be suspended from the cords 41 about the pendulums 40. The movement imparted to the tubes 17 by the platforms will cause the pendulums to strike against the rings and jar the dust loose from the walls of the tubes.

It is desirable that a flow of air be provided throughout the entire length of the tubes 17, because some of the dust in the tubes is so light that it will not settle rapidly, and the downward flow of air will serve to carry this light dust downward into the chamber 16. This downward flow of air is obtained by producing a suction in the lower chamber, and to this end, in the present case, a narrow chamber or conduit 43 is formed centrally within the tube supporting frame and extends longitudinally of the frame and upwardly from the lower chamber 16, as shown in Fig. 2. The upper part of the chamber 43 is connected to a pipe 44 leading to the suction side of a fan 45, and a pipe 46 conducts air from the fan to the upper chamber 14. The lower end of the chamber 43 preferably flares outwardly at 47 that air may be gently removed from the chamber 16 without carrying with it a large amount of dust, and by constructing the chamber 43 so that it extends upwardly throughout its length the dust is given an opportunity to settle out of the air rising therein. Tubes 48 may be provided extending across the chamber 43 to provide openings for the cross-braces 49 and shafts 25 and 34.

As a result of the construction just described, a comparatively small portion of the entire air handled by the dust collector is sucked from the lower chamber 16 by the fan 45 and is returned to the upper chamber. This produces a downward flow of air entirely through the tubes 17 that serves to pull down the extremely light dust that otherwise would remain suspended within the tubes.

In some embodiments of the invention it may be desirable to cause the tubes 17 to collapse from time to time further to dislodge the dust from the walls thereof, and to this end the upper chamber 14 is separated by longitudinally extending partitions 50 and a transverse partition 51 into compartments 52, eight compartments being shown. Air is supplied to the compartments 52 from a drum 53 which receives dust laden air from a main pipe 54 and from the pipe 46 leading from the fan 45, and a rotating gate 55 shaped like a fan, as shown in Fig. 4, serves periodically to cut off the supply of air to each compartment 52, with the result that air is temporarily prevented from reaching the tubes leading from a compartment. The gate 55 may be slowly rotated by a vertical shaft 56 having a worm and gear connection with a horizontal shaft 57, and since the suction fan 45 maintains a slight suction within all the tubes 17 the tubes that are temporarily shut off by the gate 55 from the supply of air will be collapsed by the suction produced therein.

Dust laden air may be forced to the dust collector by a fan 58, and the operating parts of the dust collector may be driven from a main shaft 59 operated by a belt 60. Belts 61 and 62 drive the unbalanced wheels from the main shaft 59, and the suction fan 45 may be driven from the shaft 59 by a belt 63. A belt 64 drives shaft 57 to operate the gate 55.

In some cases it may be desirable to confine the air or gas that passes through the walls of the tubes 17 to prevent the same from escaping into the atmosphere. For example, if powdered sulphur is to be removed from the air, there is danger of it exploding, due to its highly combustible nature. It may therefore be desirable to add a non-explosive gas such as carbon dioxide to the sulphur laden air, and since the gas is destructive to human life it must be confined. The dust collector may therefore be enclosed by a surrounding chamber consisting of side walls 65 and end walls 66, and the air or gas within this chamber may be removed by suitable means not shown.

What is claimed is:

1. The process of treating dust laden air to separate the dust and air, which consists in passing the dust laden air into fabric tubes the mesh of which will permit the passage of air and substantially prevent the passage of dust, and producing a continuous suction of light character through the tubes to pull through the tubes the dust left in the tubes by the air that escaped through the mesh of the tubes.

2. The process of treating dust laden air to separate the dust and air, which consists in passing the dust laden air into fabric tubes the mesh of which will permit the passage of air and substantially prevent the passage of dust, simultaneously agitating the fabric tubes to keep the dust from clogging the mesh of the fabric tube that the air may pass through the mesh of the fabric, and producing a continuous suction of light character through the tubes to pull through the tubes the dust left therein by the air that escaped through the mesh of the tubes.

3. The process of treating dust laden air to separate the dust and air, which consists in passing the dust laden air into fabric tubes the mesh of which will permit the passage of air and substantially prevent the passage of dust, and producing a continuous suction of light character through the tubes to remove the dust therefrom by drawing air from one end of the tubes and delivering it to the other end thereof through a closed circuit.

4. The process of treating dust laden air to separate the dust and air, which consists in passing the dust laden air into fabric tubes the mesh of which will permit the passage of air and substantially prevent the passage of dust, producing a continuous suction of light character through the tubes to carry the dust left therein by the air through the tube, and cutting off temporarily the supply of dust laden air to successive groups of the tubes that the suction through the cut off tubes may collapse them further to remove the dust therefrom.

5. A dust collector, comprising in combination a casing having an upper and a lower chamber, flexible tubes the walls of which are pervious to air but substantially impervious to dust leading from one chamber to the other, means for delivering dust laden air into the upper chamber under pressure to cause the air to enter the tubes and squeeze outwardly through the pervious walls of the tubes, and means for exhausting air from the lower chamber to maintain a suction in the active tubes that pulls the light dust suspended in the air of the tubes downwardly through the tubes into the lower chamber.

6. A dust collector, comprising in combination, a casing having an upper chamber divided into sections and a lower chamber, fabric tubes extending between the chambers and leading from the different sections of the upper chamber, a drum communicating with the different sections of the upper chamber, means for delivering dust laden air into the tubes through the upper chamber to permit the air to escape through the mesh of the tubes, means for sucking air from the lower chamber to produce a downward flow of air entirely through the tubes, and a valve rotatable within said drum to close the entrances to said sections successively to cut off the flow of air to the upper end of different tubes to promote the removal of dust from these tubes by exhausting air therefrom while the supply of air is cut off.

7. A dust collector, comprising in combination, a casing having an upper and a lower chamber, fabric tubes extending between the chambers, means for delivering dust laden air into the upper chamber to enter the tubes that the air may escape through the mesh of the tubes, means for sucking air from the lower chamber and returning it to the upper chamber to produce a downward flow of air entirely through the tubes, and a single valve operable automatically to cut off successively the supply of dust laden air to different groups of the tubes to promote the removal of dust from these tubes by exhausting air therefrom while the supply of air is cut off.

8. A dust collector, comprisng in combination, a casing having an upper and a lower chamber, fabric tubes extending between the chambers, means for delivering dust laden air into the upper chamber to enter the tubes that the air may escape through the mesh of the tubes, a platform supported for movement relative to the frame and having engagement with the tubes, means for imparting movement to the platform to shake the tubes, and adjustable stops for limiting the movement of the platform.

9. A dust collector, comprising in combination an elongated casing having an upper and a lower chamber, fabric tubes leading from one chamber to the other, means for delivering dust laden air into the upper chamber under pressure to cause the air to enter the tubes and squeeze outwardly through the pervious walls of the tubes, and means for exhausting air from the lower chamber to remove suspended dust from within the tubes, including an elongated chamber rising vertically from the interior of said lower chamber to permit dust to settle out of the air within the vertical chamber.

10. A dust collector, comprising in combination an elongated casing having an upper and a lower chamber, fabric tubes leading from one chamber to the other, means for delivering dust laden air into the upper chamber under pressure to cause the air to enter the tubes and squeeze outwardly through the pervious walls of the tubes, and means for exhausting air from the lower chamber to remove suspended dust from within the tubes, including a chamber that extends lengthwise of said lower chamber and has a downwardly flaring mouth that serves gently to extract the air without carrying off the heavier dust.

11. A dust collector, comprising in combination an elongated casing having an upper and a lower chamber, porous tubes leading from one chamber to the other, means for delivering dust laden air into the upper chamber, and means for exhausting air from the lower chamber to remove suspended dust from within the tubes, including an elongated chamber extending upwardly from said lower chamber and disposed centrally of said casing.

12. A dust collector, comprisng in combination a casing having an upper chamber divided into different compartments and a lower chamber, fabric tubes leading from the different compartments of the upper chamber to the lower chamber, means for delivering dust laden air to said upper chamber, means for sucking air downwardly through said tubes, and valve means for controlling the entrance to said compartments and operable successively to exclude the dust laden air from different compartments.

13. A dust collector, comprising in combination, a casing having an upper and a lower chamber, a platform supported between the two chambers for movement back and forth in a horizontal plane, aligned fabric tubes extending between the upper chamber and platform and between the platform and lower chamber so that the weight of the lower tubes is supported by the platform, means for delivering dust laden air to the upper chamber so that it will enter the tubes and escape through the mesh thereof freed from the dust, and vibratory means mounted upon and supported by the platform to vibrate the platform and tubes secured thereto to dislodge dust from the walls of the tubes.

14. A dust collector, comprising in combination, a casing having an upper and a lower chamber, a platform suspended between the two chambers by straps for free movement back and forth in a horizontal direction, aligned fabric tubes extending between the upper chamber and platform and between the platform and lower chamber so that the weight of the lower tubes is supported by the platform, means for delivering dust laden air to the upper chamber so that it will enter the tubes and escape through the mesh thereof freed from the dust, and power driven vibratory means mounted upon and supported by the platform to impart its vibrations to the suspended platform and shake the tubes secured thereto in a lateral direction.

In testimony whereof, I have signed my name to this specification.

ALBERT H. STEBBINS.